(12) United States Patent
Tattrie et al.

(10) Patent No.: US 9,329,838 B2
(45) Date of Patent: May 3, 2016

(54) USER-FRIENDLY DATA BINDING, SUCH AS DRAG-AND-DROP DATA BINDING IN A WORKFLOW APPLICATION

(75) Inventors: Scott I. Tattrie, Calgary, CA (US); Trent S. Dinn, Calgary, CA (US)

(73) Assignee: Open Text S.A., Luxembourg (LU)

( * ) Notice: Subject to any disclaimer, the term of this patent is extended or adjusted under 35 U.S.C. 154(b) by 1244 days.

(21) Appl. No.: 10/938,118

(22) Filed: Sep. 10, 2004

(65) Prior Publication Data

US 2005/0066287 A1    Mar. 24, 2005

Related U.S. Application Data

(60) Provisional application No. 60/532,776, filed on Dec. 24, 2003.

(30) Foreign Application Priority Data

Sep. 11, 2003  (CA) .................................. 2443454

(51) Int. Cl.
G06F 9/44    (2006.01)

(52) U.S. Cl.
CPC ........................................ *G06F 8/34* (2013.01)

(58) Field of Classification Search
None
See application file for complete search history.

(56) References Cited

U.S. PATENT DOCUMENTS

| | | | |
|---|---|---|---|
| 5,339,423 A * | 8/1994 | Beitel et al. | |
| 5,649,220 A | 7/1997 | Yosefi | |
| 5,752,056 A * | 5/1998 | Celik | 715/234 |
| 5,966,512 A * | 10/1999 | Bates et al. | 709/205 |
| 5,974,418 A | 10/1999 | Blinn et al. | |
| 6,167,404 A | 12/2000 | Morcos et al. | |
| 6,196,393 B1 | 3/2001 | Kruk et al. | |
| 6,249,291 B1 * | 6/2001 | Popp et al. | 345/473 |
| 6,330,006 B1 * | 12/2001 | Goodisman | 715/762 |
| 6,339,838 B1 | 1/2002 | Weinman, Jr. | |
| 6,415,259 B1 | 7/2002 | Wolfinger et al. | |
| 6,429,880 B2 * | 8/2002 | Marcos et al. | 715/744 |

(Continued)

FOREIGN PATENT DOCUMENTS

WO    WO2004/012109 A1    2/2004

OTHER PUBLICATIONS

Dan et al., "Web services on demand: WSLA-driven automated management," IBM Systems, Journal, vol. 43, No. 1, 2004, pp. 136-158.

(Continued)

*Primary Examiner* — Evral E Bodden
(74) *Attorney, Agent, or Firm* — Sprinkle IP Law Group

(57) ABSTRACT

A software facility allows for easy binding of a data component to a feature of a software component. Prior to the binding, a graphical indication of the software component and a graphical indication of the feature of the software component are displayed. In addition, an indication of an element of the data component is displayed in a display area approximately adjacent to the displayed software component. The software facility receives a user input command to bind the data component to the feature of the software component. The user input command may include dragging the indication of an element of the data component from the data component display area to the feature of the software component and subsequently dropping it on the feature. As a result, the software facility automatically generates script or code that provides executable instructions to bind the feature of the software component to the data component.

18 Claims, 10 Drawing Sheets

(56) References Cited

U.S. PATENT DOCUMENTS

| | | | |
|---|---|---|---|
| 6,430,538 B1 | 8/2002 | Bacon et al. | |
| 6,437,805 B1* | 8/2002 | Sojoodi et al. | 715/763 |
| 6,442,563 B1 | 8/2002 | Bacon et al. | |
| 6,484,150 B1 | 11/2002 | Blinn et al. | |
| 6,493,731 B1 | 12/2002 | Jones et al. | |
| 6,553,563 B2* | 4/2003 | Ambrose et al. | 717/116 |
| 6,621,505 B1 | 9/2003 | Beauchamp et al. | |
| 6,714,219 B2 | 3/2004 | Lindhorst et al. | |
| 6,714,953 B2* | 3/2004 | Grubbs et al. | |
| 6,745,221 B1 | 6/2004 | Ronca | |
| 6,860,422 B2 | 3/2005 | Hull et al. | |
| 6,874,146 B1 | 3/2005 | Iyengar | |
| 6,904,412 B1 | 6/2005 | Broadbent et al. | |
| 6,968,503 B1 | 11/2005 | Chang et al. | |
| 6,975,914 B2 | 12/2005 | DeRemer | |
| 6,990,654 B2* | 1/2006 | Carroll, Jr. | 717/109 |
| 7,017,123 B2* | 3/2006 | Chickles et al. | 715/816 |
| 7,076,728 B2 | 7/2006 | Davis et al. | |
| 7,124,373 B1* | 10/2006 | Patil | 715/779 |
| 7,127,716 B2 | 10/2006 | Jin et al. | |
| 7,134,090 B2* | 11/2006 | Kodosky et al. | 715/769 |
| 7,143,343 B2 | 11/2006 | Bender et al. | |
| 7,159,185 B1* | 1/2007 | Vedula et al. | 715/763 |
| 7,161,108 B2 | 1/2007 | O'Connell et al. | |
| 7,194,692 B2* | 3/2007 | Marcos et al. | 715/744 |
| 7,194,737 B2 | 3/2007 | Amodio et al. | |
| 7,224,717 B1 | 5/2007 | Lam et al. | |
| 7,321,864 B1 | 1/2008 | Gendler | |
| 7,370,315 B1 | 5/2008 | Lovell | |
| 7,426,548 B2 | 9/2008 | Griffin et al. | |
| 7,428,495 B2 | 9/2008 | Dhar et al. | |
| 7,483,902 B2 | 1/2009 | Guai et al. | |
| 7,500,185 B2 | 3/2009 | Hu | |
| 7,539,982 B2 | 5/2009 | Stuart | |
| 7,543,267 B2* | 6/2009 | Lindhorst et al. | 717/105 |
| 7,634,756 B2 | 12/2009 | Bjornson et al. | |
| 7,640,548 B1 | 12/2009 | Yu et al. | |
| 7,788,214 B2 | 8/2010 | Fernandez et al. | |
| 7,917,888 B2 | 3/2011 | Chong et al. | |
| 7,945,093 B2 | 5/2011 | Fowler | |
| 7,984,423 B2* | 7/2011 | Kodosky et al. | 717/113 |
| 8,082,189 B2 | 12/2011 | Grew et al. | |
| 8,090,612 B2 | 1/2012 | Chao et al. | |
| 8,095,565 B2* | 1/2012 | Dengler et al. | 707/796 |
| 8,327,263 B2* | 12/2012 | Atkinson et al. | 715/255 |
| 8,719,773 B2 | 5/2014 | Slone | |
| 2001/0045963 A1 | 11/2001 | Marcos et al. | |
| 2002/0007405 A1 | 1/2002 | Bahadur | |
| 2002/0029376 A1* | 3/2002 | Ambrose et al. | 717/113 |
| 2002/0040312 A1 | 4/2002 | Dhar et al. | |
| 2002/0085020 A1* | 7/2002 | Carroll, Jr. | 345/700 |
| 2002/0133635 A1 | 9/2002 | Schechter et al. | |
| 2002/0165912 A1 | 11/2002 | Wenocur et al. | |
| 2002/0174422 A1* | 11/2002 | Kelley et al. | 717/178 |
| 2002/0184610 A1 | 12/2002 | Chong | |
| 2003/0093433 A1 | 5/2003 | Seaman et al. | |
| 2003/0093755 A1 | 5/2003 | O'Carroll et al. | |
| 2003/0167277 A1 | 9/2003 | Hejlsberg | |
| 2003/0172196 A1 | 9/2003 | Hejlsberg | |
| 2004/0003353 A1 | 1/2004 | Rivera et al. | |
| 2004/0006598 A1 | 1/2004 | Bargagli Damm et al. | |
| 2004/0078258 A1 | 4/2004 | Schultz et al. | |
| 2004/0083274 A1 | 4/2004 | Katiyar | |
| 2004/0088647 A1 | 5/2004 | Miller et al. | |
| 2004/0127279 A1 | 7/2004 | Gatto et al. | |
| 2004/0236835 A1 | 11/2004 | Blankenship | |
| 2004/0250213 A1* | 12/2004 | Shalabi et al. | 715/762 |
| 2005/0015746 A1 | 1/2005 | Shukla et al. | |
| 2005/0060684 A1 | 3/2005 | Gupta | |
| 2005/0066287 A1* | 3/2005 | Tattrie et al. | 715/769 |
| 2005/0066304 A1 | 3/2005 | Tattrie et al. | |
| 2005/0091576 A1 | 4/2005 | Relyea et al. | |
| 2005/0102608 A1 | 5/2005 | Batres | |
| 2005/0114405 A1 | 5/2005 | Lo | |
| 2005/0216830 A1 | 9/2005 | Turner et al. | |
| 2005/0262429 A1 | 11/2005 | Elder et al. | |
| 2005/0262430 A1 | 11/2005 | Lawrence | |
| 2005/0273272 A1 | 12/2005 | Brando et al. | |
| 2006/0004827 A1 | 1/2006 | Stuart | |
| 2006/0047665 A1 | 3/2006 | Neil | |
| 2006/0085342 A1 | 4/2006 | Chen et al. | |
| 2006/0123039 A1 | 6/2006 | Scheuerle | |
| 2006/0259524 A1 | 11/2006 | Horton | |
| 2006/0282473 A1 | 12/2006 | Horrocks et al. | |
| 2007/0074121 A1 | 3/2007 | Mullender et al. | |
| 2007/0192402 A1 | 8/2007 | Dean et al. | |
| 2007/0245302 A1 | 10/2007 | Grotjohn et al. | |
| 2007/0276689 A1 | 11/2007 | Slone | |
| 2008/0012525 A1 | 1/2008 | Lin | |
| 2008/0189679 A1* | 8/2008 | Rodriguez et al. | 717/105 |
| 2008/0275927 A1 | 11/2008 | Han et al. | |
| 2008/0278740 A1 | 11/2008 | Bird et al. | |
| 2010/0070945 A1 | 3/2010 | Tattrie | |
| 2012/0023064 A1* | 1/2012 | Ireland | 707/610 |
| 2014/0223411 A1 | 8/2014 | Slone | |

OTHER PUBLICATIONS

International Search Report and Written Opinion; International Patent Application No. PCT/US07/68825; Filed May 11, 2007; Applicant; Captaris, Inc.; Mailed: Jul. 17, 2008; 12 pages.

Castellanos, et al., "iBOM: A Platform for Intelligent Business operation Management," Proceedings of the 21st International Concerence on Data Engineering, 2005, pp. 1-12.

Continuous Business Process Management with HOLOSOFX BPM Suite and IBM MOSeries Workflow, ibm.com/redbooks, May 2002, p. 1-534.

Gannon, et al., *A Quick Tour of LEAD via LEAD Portal & Application Orchestration*, Indiana University, Jul. 21-22, 2005, p. 1-46.

Schmidt, Building Workflow Business Objects, OOPSLA '98 Business Object Workshop IV, 1998, p. 1-14.

Senkul and Torosola, "An Architecture for Workflow Scheduling Under Resource Allocation Constraints," Information Systems 30 (2005), p. 399-422.

Office Action issued in U.S. Appl. No. 11/486,397, mailed Mar. 10, 2010, 22 pgs.

Levitus, et al., "MacWorld Microsoft Office 2001 Bible," IDG Books Worldwide, Inc., 2001, pp. 163-178.

Office Action issued in U.S. Appl. No. 11/486,398, mailed Jul. 26, 2010, 16 pgs.

"Captaris Announces Teamplate for .NET 4.1," CMSWire, Apr. 4, 2004, printed from http://www.cmswire.com/cms/portal/captaris-announces-template-for-net-41-000271.php on Jul. 14, 2010, 3 pgs.

"Captaris Workflow, powered by Teamplate," Captaris, 2005, 3 pgs.

"Captaris Workflow Technical Overview," Captaris, 2005, 4 pgs.

Chen, Qiming, et al., "Multi-Agent Cooperation, Dynamic Workflow and XML for E-Commerce Automation," HP Laboratories Palo Alto, Oct. 1999, 10 pgs.

Wang, Alf Inge, "Experience Paper: Using XML to Implement a Workflow Tool," NTNU, Trondheim, Norway, Apr. 4, 2001, 7 pgs.

Tripathy, Anand R., et al., "Implementing Distributed Workflow Systems from XML Specifications," University of Minnesota Department of Computer Science, 2000, 9 pgs.

Filho, Roberto Silveira Silva, "A Fully Distributed Architecture for Large Scale Workflow Enactment," International Journal of Cooperative Information Systems, vol. 12, No. 4, 2003, 16 pgs.

Kay, Michael, "Building Workflow Applications with XML and Xquery," DataDirect Technologies, Inc., 2006, 10 pgs.

Shegalov, German, et al., "XML-Enabled Workflow Management for E-Services Across Heterogeneous Platforms," The VLDB Journal, vol. 10, 2001, 13 pgs.

Stauch, Marc, et al., "Design and Implementation of an XSL-T and XML-based Workflow System," XML Europe, 2001, 18 pgs.

Office Action issued in U.S. Appl. No. 11/486,397, mailed Aug. 13, 2010, 16 pgs.

Office Action issued in U.S. Appl. No. 11/486,398, mailed Nov. 9, 2010, 20 pgs.

Captaris, "Alchemy Workflow Solutions—Datasheet," Captaris, 2005, 4 pgs.

(56) References Cited

OTHER PUBLICATIONS

Captaris, "Doculabs MarketFocus White Paper: Analysis of the Captaris Solution for Fixed Content Management," Doculabs, 2005, 18 pgs.
Captaris, "Nexant Automates Energy Efficiency with Captaris Workflow, Case Study," 2005, 3 pgs.
Sparta Systems, Inc., "TrackWise—User's Guide," 2000, 175 pgs.
Teamware Group, "Teamware Flow 3.1 User's Guide," Third Edition Apr. 2000, 164 pgs.
Marchetti, Andrea et al., "Xflow: An XML-Based Document Centric Workflow," WISE 2005, LNCS 3806, 2005, 14 pgs.
Krishnan, Rupa et al., "Xdoc-WFMS: A Framework for Document Centric Workflow Management Lecture Notes in Computer Science," 2002, vol. 2464/2002, pp. 348-362.
Examiner's Report for Canadian Patent Application No. 2,443,454, mailed Jan. 25, 2011, 6 pgs.
Examiner's Report for Canadian Patent Application No. 2,451,164, mailed Feb. 16, 2011, 4 pgs.
Office Action for U.S. Appl. No. 11/486,397, mailed Feb. 2, 2012, 14 pgs.
Office Action for U.S. Appl. No. 12/396,445 mailed Mar. 13, 2012, 14 pgs.
Office Action for U.S. Appl. No. 11/486,398 mailed Mar. 20, 2012, 36 pgs.
Arpinar, Ismailcem Budak et al., An Efficient Data Extraction and Storage Utility for XML Documents Proceedings of the 39th Annual ACM Southeast Conference, 2001, 6 pages.
IBM DB2: Administering XML Extender (IBM DB2 Help Manual), IBM, 2006, 3 pages.
Berlea, A. et al, fxt—A Transformation Language for XML Documents, Journal of Computing and Information Technology, vol. 10, 2001, 19 pages.
Hsiao, Hui-I, Advanced Technology for Managing XML Document Collections IEEE, 2005, 4 pages.
Song, Minrong et al., REPOX: An XML Repository for Workflow Design and Specifications, Aug. 26, 2001, 43 pages.
Eder, Johann et al., Composition of Transformations for XML Schema Based Documents, Proceedings of Short Papers of the 7'h East European Conference on Advances in Databases and Information Systems, 2003, 10 pages.
Workflow Management Coalition Workflow Standard—Interoperability Wf-XML, The Workflow Management Coalition. May 1, 2000, 40 pages.
Doucent, Antoine et al., Accurate Retrieval of XML Document Fragments Using EXTI RP, INEX 2003 Workshop Proceedings, 2003, 8 pages.
Tennison, Jeni, Processing XML Documents with Pipelines, DocEng. 06, 2006, 44 pages.
XML Pipeline definition, Wikipedia.org, Retrieved Mar. 16, 2012, 5 pages.
Rossi, Davide, Orchestrating Document-based Workflows with X-Folders, 2004 ACM Symposium on Applied Computing, 2004, 5 pages.
Page, Sam, XSL Pipeline Processing Using XML, 2005, 6 pages.
Pediaditakis, Michael et al., Device neutral pipelined processing of XML documents, WWW2003, 12th International World Wide Web Conference, 2003, 4 pages.
Bae, et al. "A document-process association model for workflow management," Department of Industrial Engineering, Seoul National Univerity, Jun. 7, 2001, 16 pages.
Office Action for U.S. Appl. No. 11/486,397, mailed Jun. 6, 2012, 9 pgs.
Office Action for U.S. Appl. No. 11/486,398, mailed Jul. 9, 2012, 35 pages.
Examiner's Report issued for Canadian Patent Application No. 2,443,454, mailed Jul. 24, 2012, 6 pages.
Final Office Action for U.S. Appl. No. 12/396,445, mailed Sep. 28, 2012, 14 pgs.
Primary and Foreign Key Constraints retrieved from http://msdn.microsoft.com/en-us/library/ms179610(d=printer).aspx on Sep. 6, 2012, 5 pages.
Michelle A. Poolet, "SQL by Design: How to Choose a Primary Key" dated Apr. 1, 1999, retrieved from http://www.sqlmag.com/print/systems-administrator/sql-by-design-how-to-choose-a-primary-key, 4 pages.
Workflow actions quick reference (SharePoint 2013 Workflow platform) SharePoint 2013, received from http://msdn.microsoft.com/en-us/library/jj64026(d=printer).aspx, 8 pages.
Office Action issued for U.S. Appl. No. 12/396,445, mailed Jul. 16, 2013, 14 pages.
Examination Report issued for Canadian Patent Application No. 2,451,164, mailed Aug. 23, 2013, 4 pages.
"Plug-in (computing)" retrieved from http://en.wikipedia.orewiki/Plug-in_computing), printed Oct. 1, 2013, 7 pages.
Office Action for U.S. Appl. No. 12/396,445, mailed Dec. 16, 2014, 9 pgs.
Oracle Workflow, Developer's Guide, Release 2.6.3, Sep. 2003, 622 pgs.
"Add/remove a shared assembly to/from the .net Gac," TheScarms.com, Oct. 28, 2003, retrieved from <http://www.thescarms.com/dotnet/GacUtil.aspx>, 2 pgs.
Joshi, Bipin, "Introduction to .NET Reflection," BinaryIntellect, Jun. 10, 2001, retrieved from <http://www.binaryintellect.net/articles/90c953d1-134c-4ecb-ab5f-5462029cdde4.aspx>, 6 pgs.
Examination Report for Canadian Patent Application No. 2,451,164, mailed Dec. 2, 2014, 4 pgs.
Malone et al., "Experiments with Oval: a radically tailorable tool for cooperative work," Proceeding CSCW '92 Proceedings of the 1992 ACM Conference on Computer-supported cooperative work, pp. 289-297.
Office Action for U.S. Appl. No. 11/747,888, mailed Jul. 16, 2008, 11 pgs.
International Preliminary Report on Patentability for International Patent Application No. PCT/US07/68825, mailed May 14, 2009, 7 pages.
Office Action for U.S. Appl. No. 12/353,849, mailed Jun. 7, 2011, 14 pgs.
Captaris, "Captaris Delivers Workflow Business Solutions," White paper, 2004, pp. 1-8.
Office Action for U.S. Appl. No. 12/353,849, mailed Nov. 16, 2011, 21 pgs.
Office Action for U.S. Appl. No. 12/353,849, mailed Mar. 14, 2012, 20 pgs.
Office Action for U.S. Appl. No. 12/353,849, mailed Aug. 22, 2012, 22 pgs.
Office Action for U.S. Appl. No. 12/353,849, mailed Apr. 22, 2013, 19 pgs.
Office Action for U.S. Appl. No. 12/353,849, mailed Sep. 13, 2013, 29 pgs.
Office Action for U.S. Appl. No. 12/396,445, mailed Jan. 23, 2014, 9 pgs.
Fry et al., Experiments with OVAL: A Radically Tailorable Tool for Cooperative Work, 1992.
Office Action for U.S. Appl. No. 10/938,396, mailed Sep. 3, 2008, 17 pgs.
Workflow Info Schema and WorkflowActions Schema Overview, May 2010 (updated Feb. 2011), received from http://msdn.microsoft.com/en-us/library/bb897626(d=printer,v=office.14).aspx, printed on Nov. 20, 2012, 3 pgs.
Notice of Allowance for U.S. Appl. No. 12/396,445, mailed Jun. 26, 2015, 12 pgs.
Office Action for U.S. Appl. No. 14/245,583, mailed Dec. 30, 2015, 24 pgs.
Office Action for U.S. Appl. No. 14/245,583, mailed Jul. 24, 2015, 16 pgs.
Notice of Allowance for Canadian Application No. 2,451,164, mailed Jan. 6, 2016, 1 pg.
Notice of Allowance for U.S. Appl. No. 12/936,445, mailed Jan. 15, 2016, 5 pgs.

\* cited by examiner

USER-FRIENDLY DATA BINDING, SUCH AS DRAG-AND-DROP DATA BINDING IN A WORKFLOW APPLICATION

CROSS-REFERENCE TO RELATED APPLICATION(S)

This application claims priority to U.S. Provisional Application No. 60/532,776, filed Dec. 24, 2003, which is herein incorporated by reference. This application also claims priority to Canadian Patent Application No. 2,443,454, entitled "Data Binding Method in Workflow System," filed Sep. 11, 2003, which is also herein incorporated by reference.

BACKGROUND

In the context of applications software development, the practice of data binding addresses the common need for an application to access data stored in an independent data source. Generally, data binding involves retrieving data from a data source and subsequently facilitating the use of the retrieved data. In a more specific example, data binding allows a mapping from data (e.g., XML (Extensible Markup Language) data or database data) to a class or other programming structure associated with the application (e.g., a Person class, a Product class, a Meeting class, etc.). In another example, data binding may be used to retrieve data for use in setting up a software component, such as a "web control" (e.g., list box, drop-down list, etc.) that encapsulates a user interface and other related functionality. After the programmer specifies the data source to be bound (e.g., a data set containing a list of names), a data binding method or function is called, which fills the control with the data (e.g., the names from the list).

Because it provides access to external data, data binding is considered a useful technique. In addition, it also provides some level of protection and integrity for the body of data being accessed. However, traditional data binding techniques have proven awkward and difficult for programmers to control and implement.

Improvements in data binding techniques continue to be made based on specially configured application programming interfaces (APIs) and other tools. Despite these improvements, data binding still proves to be a bottleneck for more rapid application development, especially for beginner programmers who are not comfortable writing the script or code needed to implement data binding.

Figure 1:
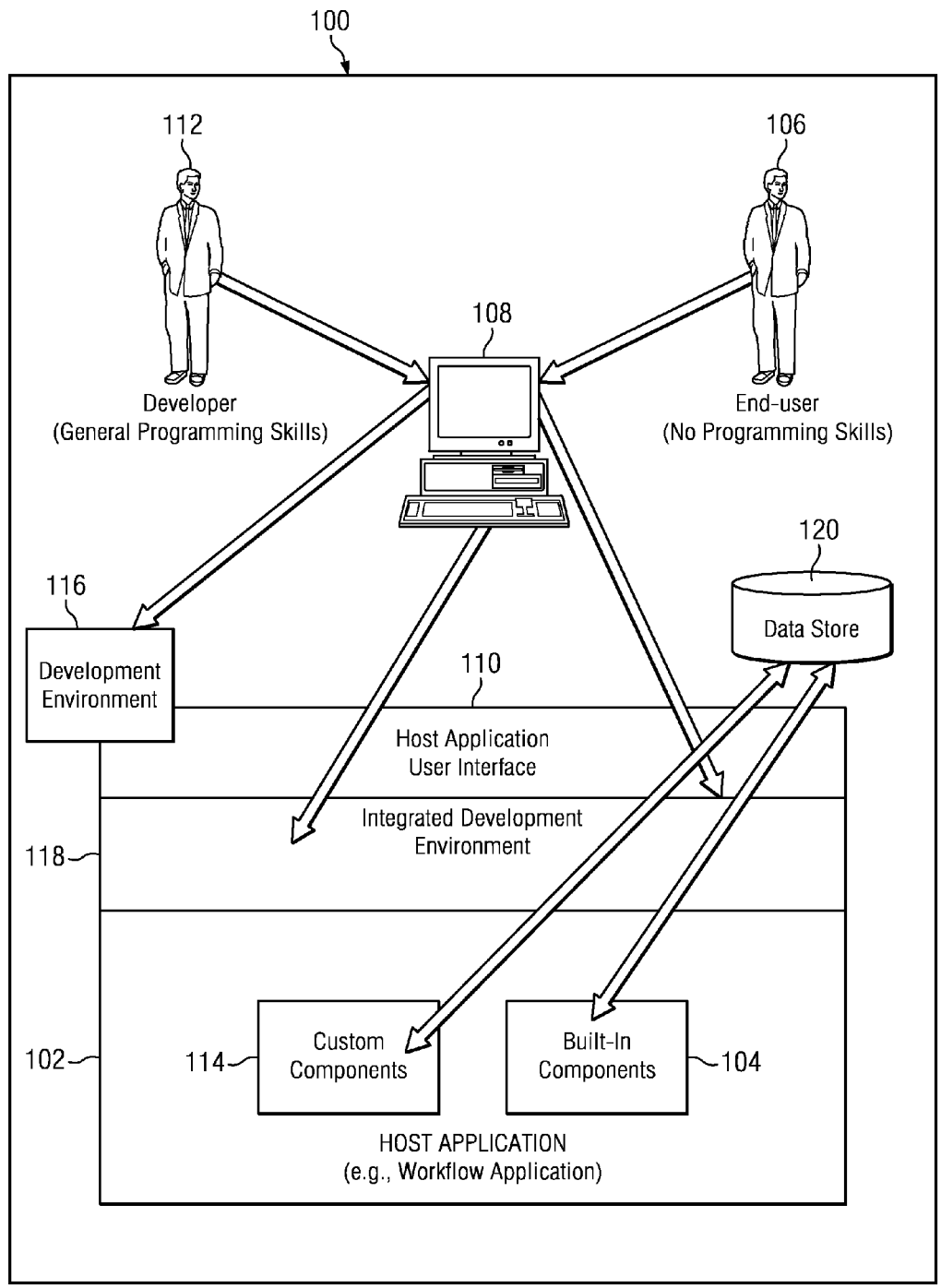
FIG. 1 is a block diagram showing an example of an environment for creating and using custom components under one embodiment of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

A software facility provides a graphical framework that enables a user with limited programming skills to implement data binding that associates various types of data from data resources (e.g., databases and XML data resources) with specified components and/or features of a software application (e.g., user interface components such as web controls). In some embodiments, the software facility provides drag-and-drop data binding functionality for ease of use. For example, the drag-and-drop data binding functionality may allow a designer or programmer to bind an XML data object, database element, or other data resource to a software component or feature of a software component without using standard programming techniques (e.g., without writing code or script).

Once the data resource and software component or feature of the software component are bound together, the software facility may load variables associated with the data resource into the software component or feature of the software component when an end user subsequently accesses the software component. In addition, the software facility may allow changes or modifications relating to the bound data to be incorporated back into the data resource once the end user terminates the access of the software component.

In some embodiments, drag-and-drop data binding is performed in the context of a software application (e.g., workflow application) having an integrated development environment, or similar environment, thereby allowing the designer to create custom functionality for subsequent use by end users.

Upon request of the designer, the software application displays a design layer (e.g., design view) of a software component (e.g., form or web form). The designer may select one or more controls or other user interface features to associate with the software component. For example, the control may be a label, button, textbox, checkbox, radio button, combo box, list box, or any other feature configured to display and/or collect data from a user.

The software application may also display a data resource selected by the designer (e.g., an XML data object or a database data object) to reveal the data resource's elements and/or nodes. In some embodiments, the data resource's elements and/or nodes may be displayed hierarchically in a tree view or as a list.

After exposing the data resource, the designer drags and drops one or more of the data resource's elements and/or nodes onto the control or other feature associated with the software component. In some embodiments, once the data resource's element or node is dragged and dropped onto the control or other feature, an icon may appear that indicates the control or other feature is bound to the data resource. While dragging and dropping is described herein as the primary user input technique for data binding, one skilled in the art would recognize that other user-friendly input techniques could be used without departing from the scope of the invention, such as "click-and-click," techniques involving double clicking, techniques involving the use of shortcut keys on a keyboard, techniques involving a touch sensitive display, techniques involving voice commands, etc.

Such actions by the designer result in the software application automatically generating the appropriate script or code used to implement the data-bound component for future use. In some embodiments, the software facility provides a script view so that the designer can view or alter the automatically generated script. Likewise, the software facility may provide property information relating to the control or other feature to help the designer check the success of the drag-and-drop data binding. For example, the property information may include information such as the name of the data resource and the path and name of the element or node. From a related property information view, the designer may update, change, or modify the data binding as needed. The designer may also delete the data binding.

According to these techniques, a designer can quickly create and populate software components such as forms or web forms. In addition, the software facility may allow the designer to create shortcuts for future development. For example, the designer may select a data resource and invoke a shortcut so that the software facility automatically creates a bound control or feature for selected elements (or all the elements) in the data resource.

II. Representative Computing Environment

FIG. 1 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, handheld devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, minicomputers, mainframe computers, and the like.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), may be distributed on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a typical environment 100 in which the software facility operates includes a host application 102. For illustrative purposes, the host application 102 in the illustrated embodiment is a workflow application, but the invention may be implemented in the context of almost any type of applications software (drawing software, data organization software, web design software, etc.). The host application 102 in the illustrated embodiment provides a set of "built-in" or default components 104 (e.g., workflow objects, data objects, resource objects, actions, etc.). Examples of such built-in components are web forms and forms, which are illustrated and described with respect to FIGS. 3 and 4, respectively. An end user 106 accesses the host application 102 via a computer 108, which displays an application interface 110 on a screen or other output device. In addition to a display screen, the computer 108 may provide a variety of input/output features, such as a touch-sensitive screen, a mouse or joystick, directional controls, speakers, a keyboard, voice-activated controls, etc.

The host application 102 is configured so that a developer 112 can enhance its functionality by designing one or more custom components 114 via a development environment 116 (e.g., Microsoft Visual Studio NET) that provides some integration with the host application through an integrated development environment 118. Once the developer 112 creates such custom components 114 and integrates them into the host application 102, the end user 106 may access the custom components 114 via the computer 108 and application interface 110, as he or she would access the built-in components 104.

In addition, the developer may perform data binding techniques associated with both the built-in 104 and custom 114 components. A data store 120 stores data used in data binding associated with the components (104 and 114) of the host application 102. For example, the data store 120 may be a relational or multidimensional database. The data store 120 may also (or alternatively) store XML data or other types of data.

III. Sample User Interface

Referring to FIGS. 2 through 8, representative computer displays or web pages will now be described from the context of a user interacting with various screens or pages. The screens of FIGS. 2 through 8 may be implemented in C# or as web pages under XML (Extensible Markup Language), HTML (HyperText Markup Language), or any other scripts or methods of creating displayable data, such as the Wireless Access Protocol ("WAP"). The screens or web pages provide facilities to receive input data, such as a form with fields to be filled in, pull-down menus or entries allowing one or more of several options to be selected, buttons, sliders, hypertext links, or other known user interface tools for receiving user input. While certain ways of displaying information to users are shown and described with respect to certain Figures, those skilled in the relevant art will recognize that various other alternatives may be employed. The terms "screen," "web page," and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

FIGS. 2 through 8 show sample screens from a workflow application, which is used here as an example of the host application 102 of FIG. 1. The workflow application of this illustrated embodiment permits users to define and track business processes, such as the flow of work between individuals and/or groups in, for example, an organization or industry. Many of the sample screens illustrated below correspond with aspects of an integrated development environment associated with the workflow application, such as the integrated development environment 118 of FIG. 1.

Figure 2A:
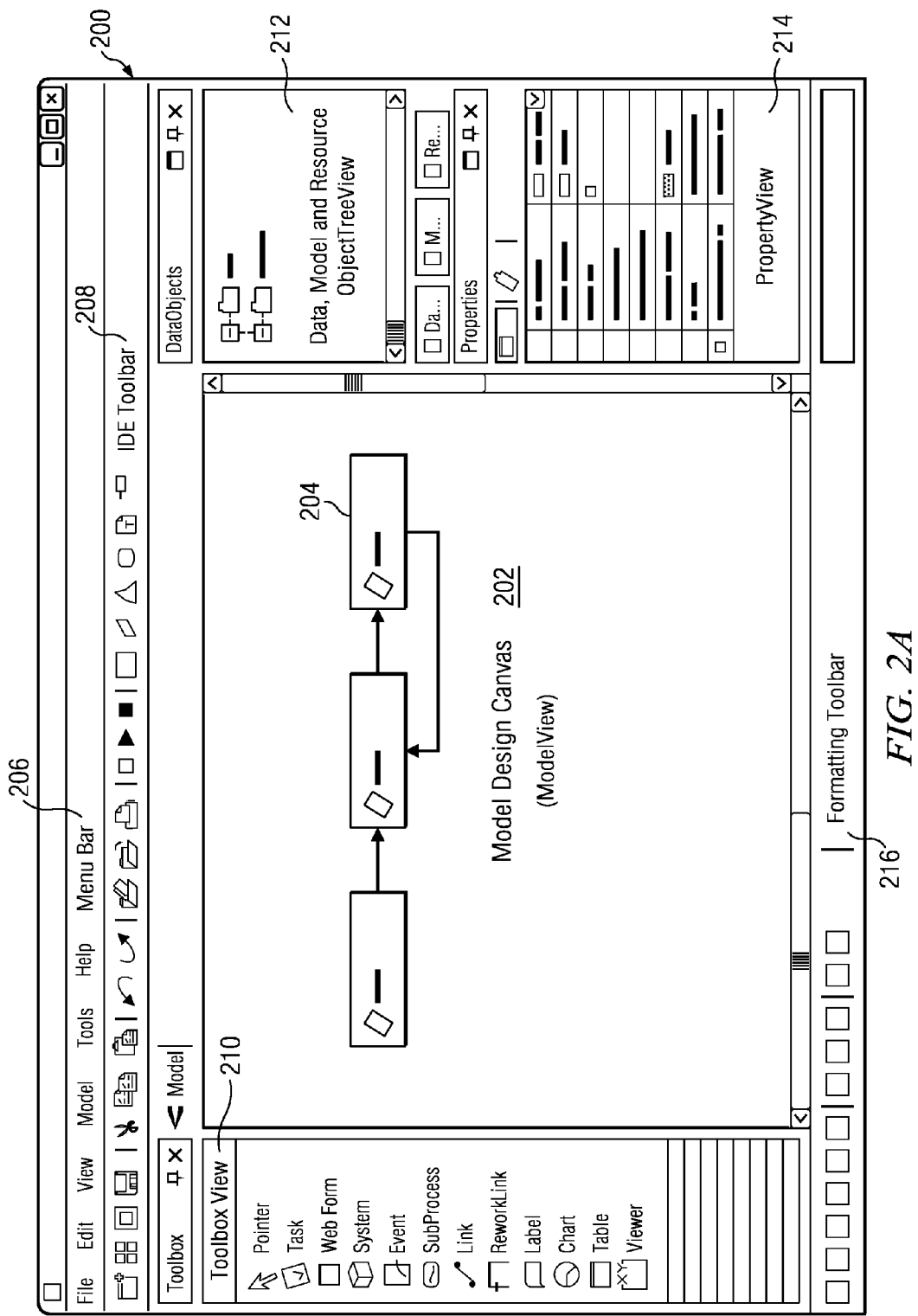
FIG. 2A is a display diagram showing a design view in the integrated development environment of FIG. 1.

Referring to FIG. 2A, a model view 200 of the workflow application includes a design view 202 (e.g., model design canvas) that provides a workspace where a user can design a high-level workflow model using custom or built-in workflow components (e.g., workflow objects, data objects, resource objects, actions, etc.). For example, the user can arrange workflow objects, such as tasks 204, in the design view 202 to build a business process. In the illustrated embodiment, the model view 200 also includes a menu bar 206, an integrated development environment toolbar 208, a toolbox view 210, an object tree view 212, a property view 214, and a formatting toolbar 216.

In the illustrated embodiment, the toolbox view 210 is part of the integrated development environment and contains four panels containing various forms, objects, utilities, and wizards used in designing a workflow model. The toolbox view 210 may have one or more tabs, such as a workflow tab, a form tab, a web form tab, and an actions tab. Clicking on one of these tabs may display a corresponding specialized toolbox. Alternatively, the appropriate specialized toolbox may be displayed automatically, depending on the user's activities. For example, if a user is working on a form in the design view 202, the form toolbox may be automatically displayed.

Figure 2B:
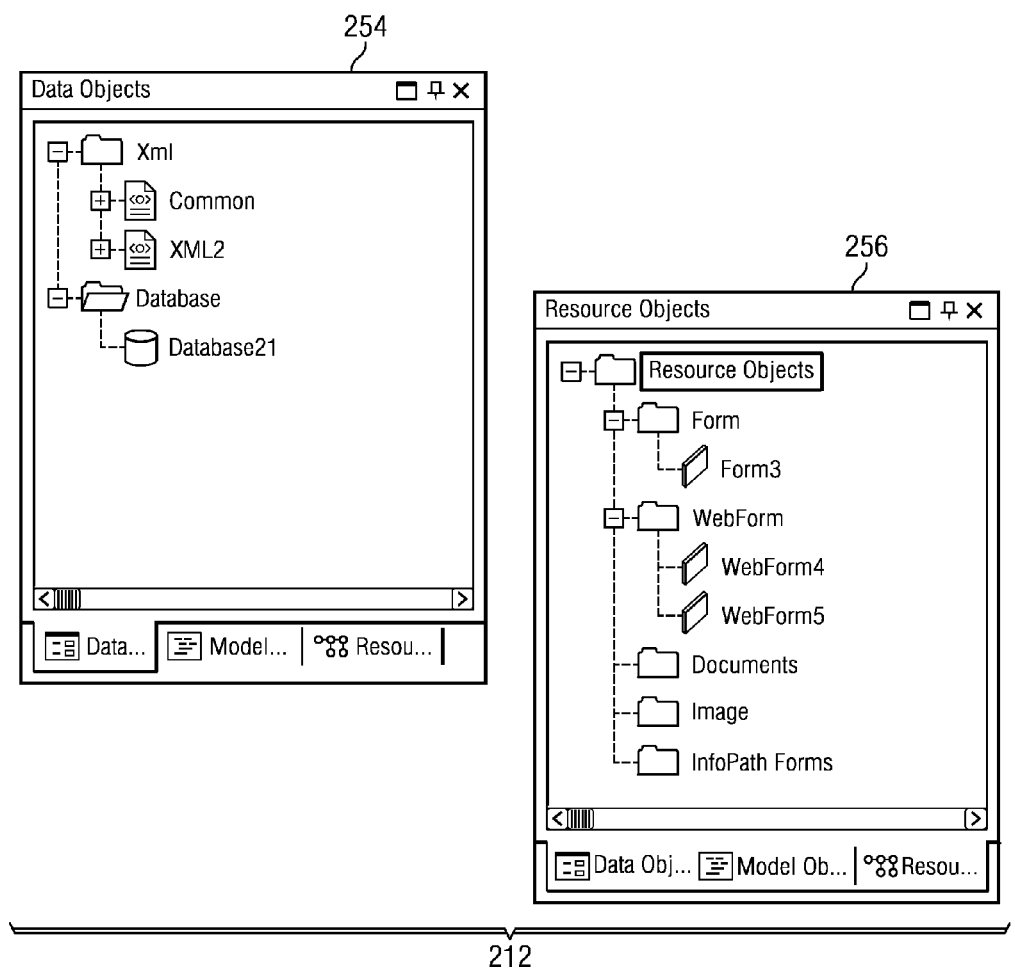
FIG. 2B is a display diagram showing an object tree view in the integrated development environment of FIG. 1.

FIG. 2B is a display diagram showing an object tree view 212 in the integrated development environment of FIG. 1. In some embodiments, the object tree view 212 is displayed by default when the integrated development environment is displayed.

The object tree view 212 provides access to resources (including data resources) within a workflow model that a designer is currently working on. As shown in FIG. 2B, the object tree view 212 of the illustrated embodiment is represented by a folder structure similar to Microsoft's Windows Explorer. For example, the folder structure may show the various components of the workflow model. Such components may include workflow objects, data objects, resource objects, actions, etc. In some embodiments, the object tree view 212 shows each different component type in a separate view. A data object view 254 and a resource object view 256 are displayed in FIG. 2B. When a hierarchical folder structure is used, the designer can access child elements and nodes of the folder view by clicking on the "+" expand nodes 218 for each folder.

Figure 3:
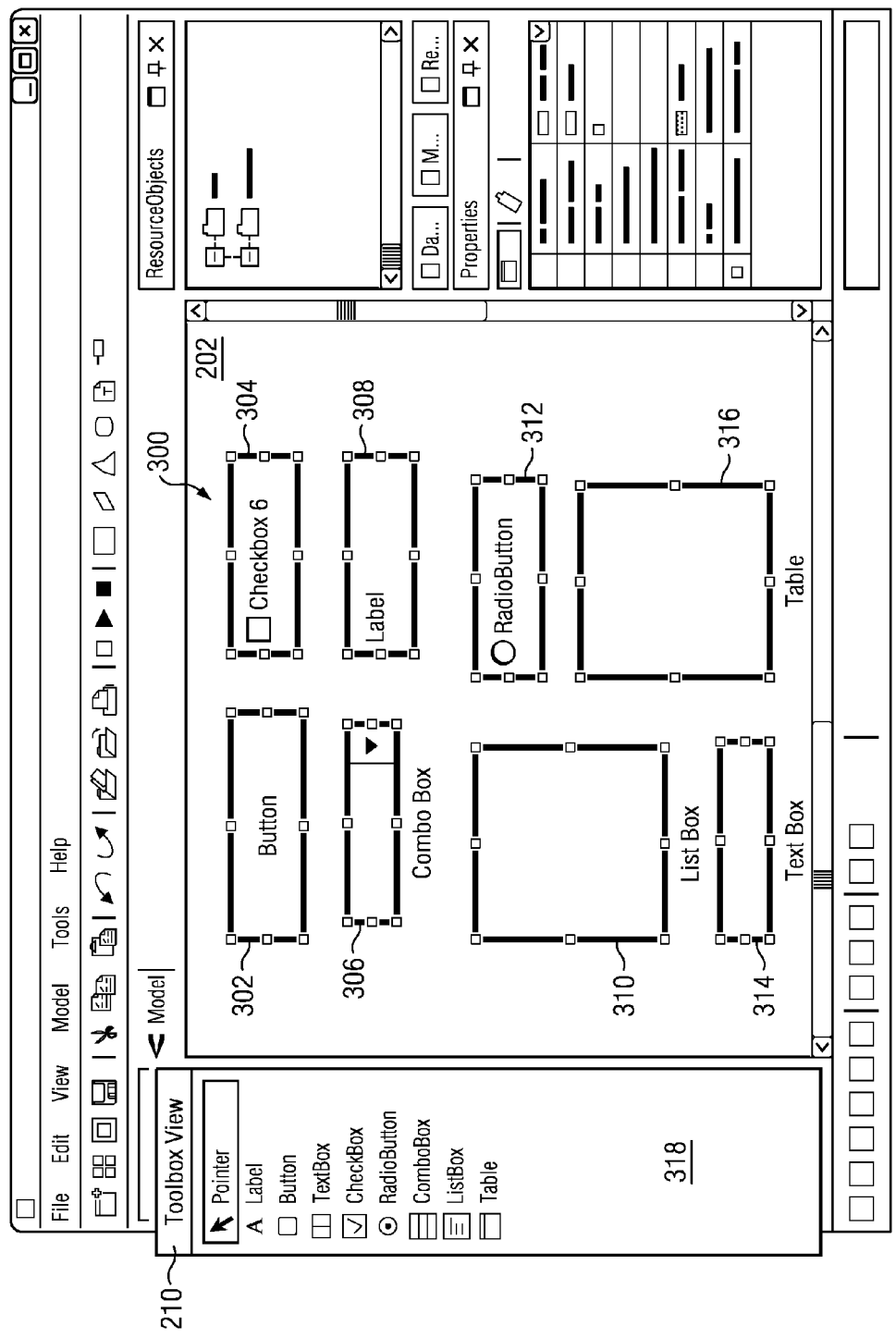
FIG. 3 is a display diagram showing an unbound web form and associated controls.

FIG. 3 is a display diagram showing an unbound web form 300 and associated controls. In the context of the workflow application of the illustrated embodiment, the web form 300 is generally used when the designer knows that the primary user interface for gathering and viewing data is a web browser. For example, the designer may create one or more web forms for each task in a workflow model. In general, web forms are platform independent and users with a compatible web browser can access the web forms regardless of their computer's operating system. Typically, the web form 300 displays a simple user interface and is highly suitable for text-intensive applications.

The designer may create the web form 300 from the design view 202 of the workflow application. The designer places and configures controls (such as Microsoft ASP .NET controls) or other features/user interface components into the web form. Such controls may include buttons 302, checkboxes 304, combo boxes 306, labels 308, list boxes 310, radio buttons 312, text boxes 314, tables 316, etc. In some embodiments, the designer can add additional functionality to the web form 300 and its controls by writing script or other code in a script view (not shown).

When the designer is creating a web form or when an existing web form is displayed in the integrated development environment, the toolbox view 210 may automatically display a web form tab 318 from which the designer can select all the available controls or features that can be added to the web form using drag-and-drop functionality. Once a control or other feature is dropped onto the web form 300, the workflow application automatically generates script or code (not shown) for the web form 300. In some embodiments, the designer can view and customize the created script or code in a script view (not shown).

Figure 4:
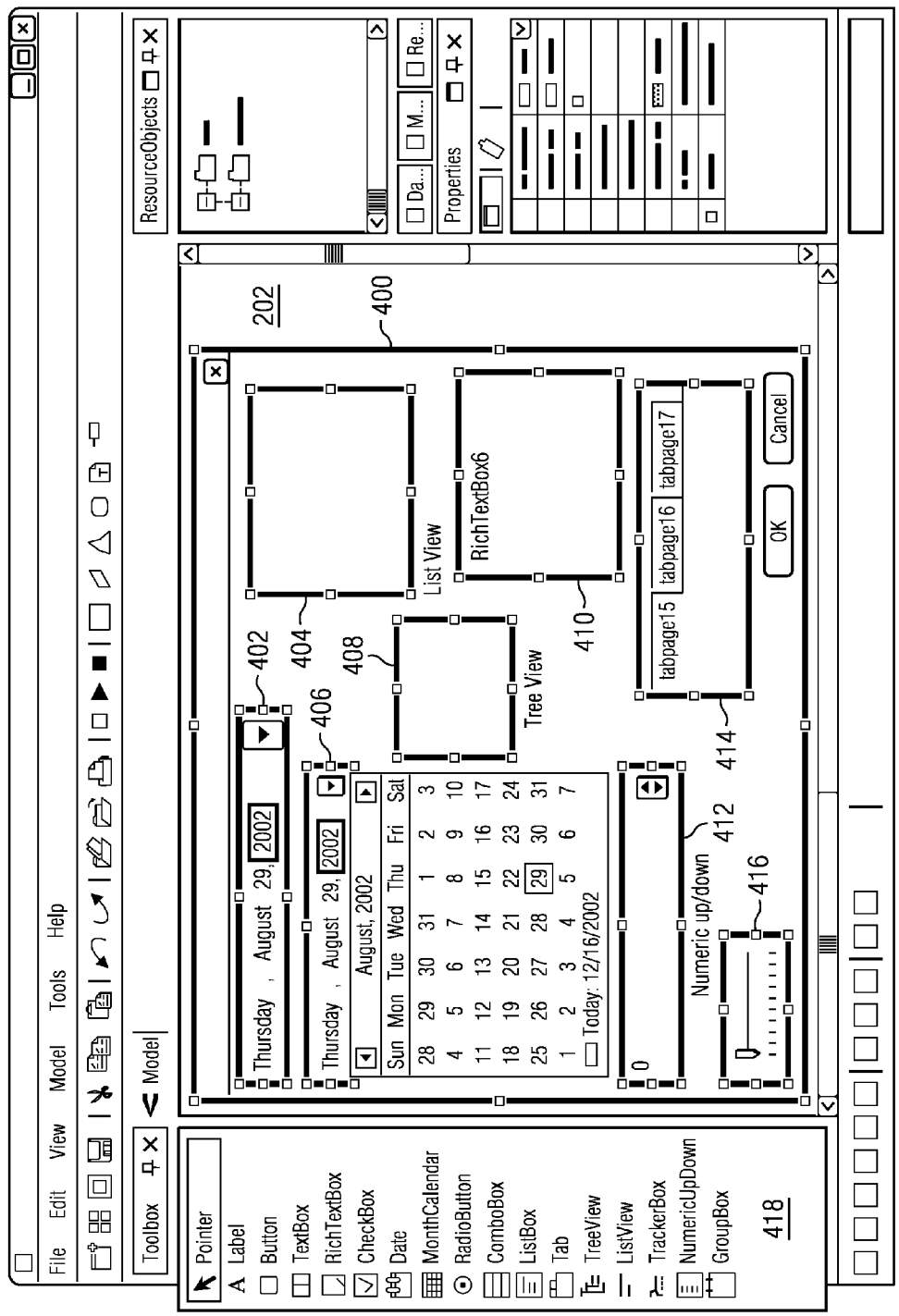
FIG. 4 is a display diagram showing an unbound form and associated controls.

Referring to FIG. 4, the designer may select to use a form 400 instead of a web form when the designer knows that an end user will input or view data in a Microsoft Windows environment, such as a Windows client. Typically, the form 400 can display a simple or complex user interface, depending on the types of controls or features used and any added functionality.

In the illustrated embodiment, the controls or features available for use with the form 400 include all the controls (302, 304, 306, 308, 310, 312, 314, and 316) of the web form 300 of FIG. 3 in addition to any of the following: date 402, list view 404, month calendar 406, tree view 408, rich text box 410, numeric up/down 412, tab 414, tracker bar 416, etc.

Like the web form 300, the form 400 can include any number of offered controls, and the designer may add extra script that can perform functions such as calling another form, accessing a database, sending an email, assembling a document, etc. As with the web form 300, the designer creates the form 400 by placing and configuring the offered controls in the design view 202. When a new form is created or an existing form is displayed, the workflow application automatically displays a form tab 418 from which all the available controls or other features can be added to the form, using, for example, drag-and-drop functionality. Each time a new control or feature is added to the form 400, the workflow application automatically generates script for the form, which can be viewed and/or customized from the script view.

Figure 7:
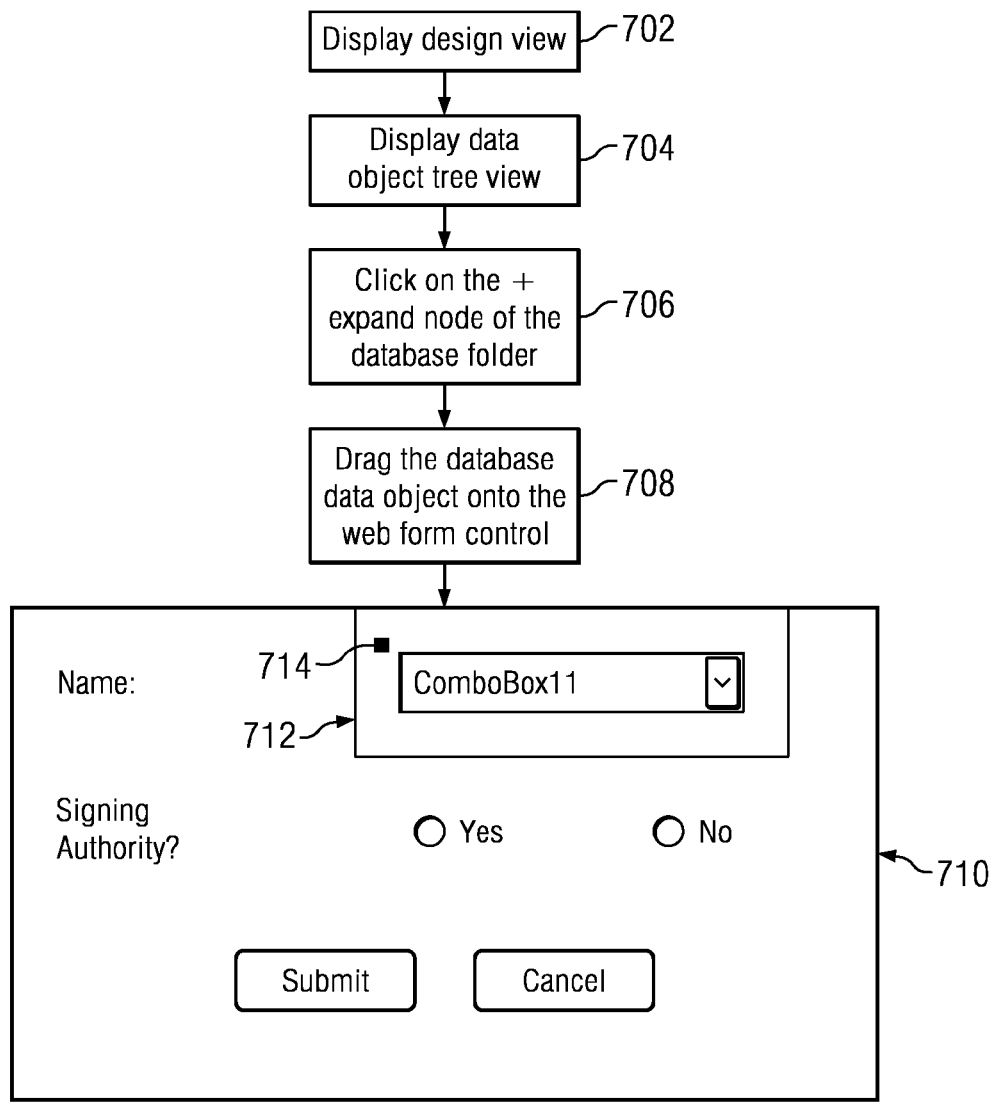
FIG. 7 is a display diagram showing data binding performed by dragging and dropping database data onto a web form.
Figure 8:
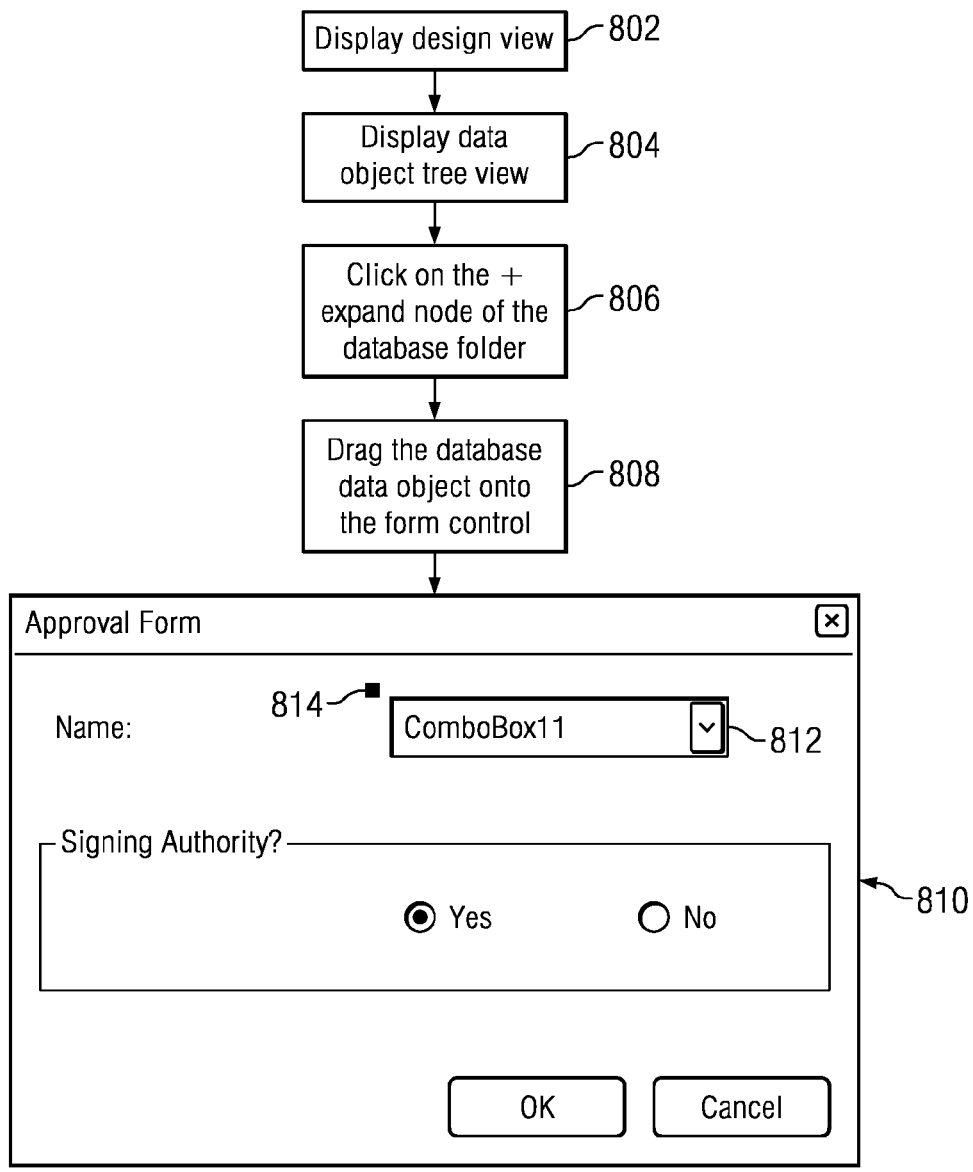
FIG. 8 is a display diagram showing data binding performed by dragging and dropping database data onto a form.

In the illustrated embodiment, there are various types of data objects available for use in the workflow application. These include XML data objects (FIGS. 5 and 6) and database data objects (FIGS. 7 and 8).

Figure 5:
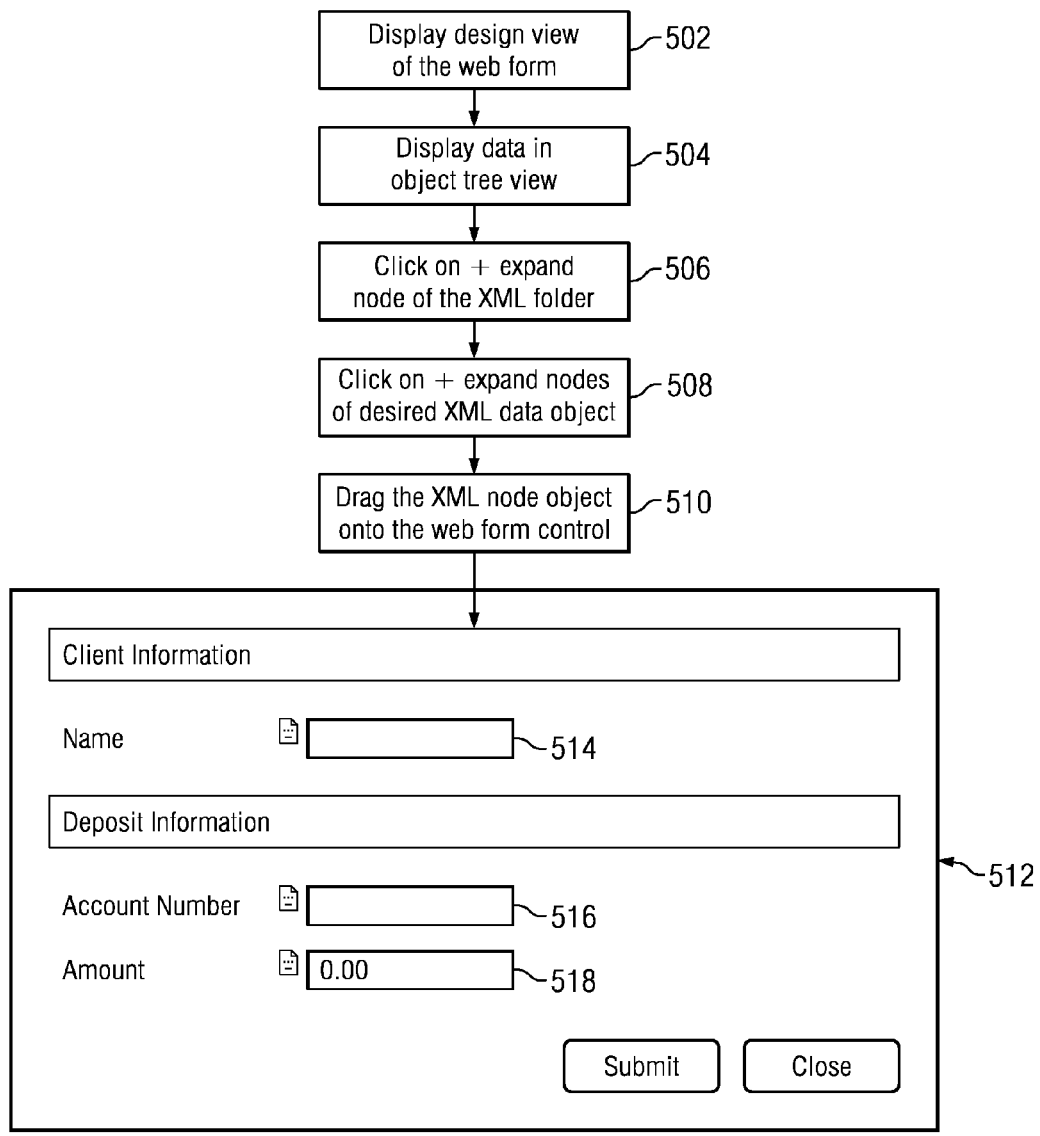
FIG. 5 is a display diagram showing data binding performed by dragging and dropping XML data onto a web form.
Figure 6:
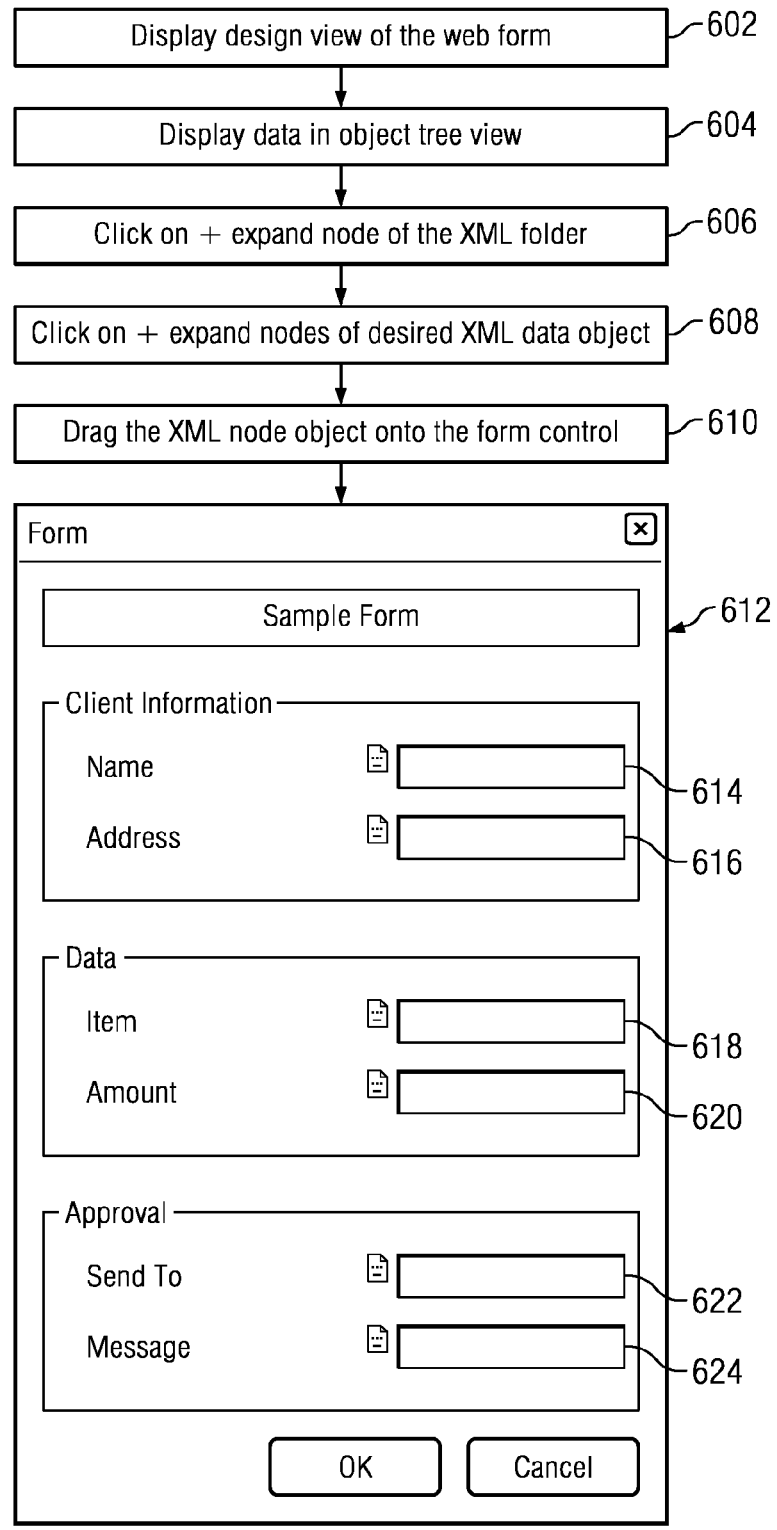
FIG. 6 is a display diagram showing data binding performed by dragging and dropping XML data onto a form.

Referring to FIGS. 5 and 6, XML data objects are typically used to hold data captured during the execution of a process. For example, during the execution of a workflow model application, there may be a number of data items that are used during execution but that are not stored in a database. XML data objects are ideal for this type of data. The XML files can be imported from and exported to a file system for more permanent data storage after a process has finished executing. The workflow application of the illustrated embodiment provides a very simple interface for working with XML data objects that does not require previous knowledge of XML file formats.

Accordingly, contents of XML files may be made available from any task within the workflow model, making the task an ideal data depository for the duration of the workflow model's execution. There may be multiple XML data objects associated with a single workflow model.

Drag-and-drop XML data binding provides a quick and easy way of binding data from the nodes of an XML data object to the controls in a web form (FIG. 5) or form (FIG. 6). By binding controls of a web form or form to corresponding elements or nodes in an XML data object, the appropriate XML variables are loaded to the controls in the web form or form. At the closing of the web form or form, property controls associated with the data as it resides in the web form or form are then loaded to the XML variables of the data source.

Referring to FIG. 5, drag-and-drop data binding is performed in the workflow application using primarily the design view 202. Upon request of the designer, the workflow application displays a web form 502 and exposes XML data objects in the object tree view 504. The designer clicks on the "+" expand node of the XML folder in the object tree view 506 to reveal the XML data structure. The designer clicks on the "+" expand node of the XML data object in the object tree view 508 to reveal the XML data object's elements and/or nodes in a hierarchical structure. The designer drags and drops a selected XML data element or nodes onto a control or other feature associated with the component 510. For example, the control may be a label, button, textbox, checkbox, data, radio button, combo box, list box, etc. As shown in block 512, the designer has dropped an XML data element or node onto a name list box 514, an account list box 516, and an amount list box 518 of the web form. Such actions by the designer result in the workflow application automatically generating the appropriate script or code used to implement the data-bound web form for future use by an end user. In this way, information entered into the web form by an end user can be populated back to an XML data store when the web form is closed.

Once the XML data element or node is dropped on the control or other feature, an XML icon may appear that indicates the control is bound to the XML data object. In some embodiments, a tool tip associated with the icon identifies the exact node or element that is bound to the control.

In some embodiments, a property of the control or other feature may be available from the property view 214 to help the designer check the success of the XML data binding. For example, the property may provide information such as the name of the data object and the path and name of the element or node. From the property view 214, the designer may update, change, or modify the XML data binding as needed. The designer may also delete the XML data binding. The designer can unbound web form controls by clicking or deleting the reference to the XML data object and node from the XML data binding property.

FIG. 6 is a display diagram showing data binding performed by dragging and dropping XML data to a form. The same techniques described above with respect to FIG. 5 (for binding XML data to a web form) are used for a form. The drag-and-drop data binding is performed in the workflow application using primarily the design view 202. Upon request of the designer, the workflow application displays a form 602 and exposes XML data objects in the object tree view 604. The designer clicks on the "+" expand node of the XML folder in the object tree view 606 to reveal the XML data structure. The designer clicks on the "+" expand node of the XML data object in the object tree view 608 to reveal the XML data object's elements and/or nodes in a hierarchical structure. The designer drags and drops a selected XML data element or node onto a control or other feature associated with the component 610. For example, the control may be a monthly calendar, a label, button, textbox, checkbox, data, radio button, combo box, list box, etc. As shown in block 612, the designer has dropped an XML data element or node onto a name text box 614, an address text box 616, an item text box 618, an amount text box 620, a send to text box 622 and a message text box 624 of the form. Such actions by the designer result in the workflow application automatically generating the appropriate script or code used to implement the data-bound form for future use by an end user. In this way, information entered into the form by an end user can be populated back to an XML data store when the form is closed.

FIGS. 7 and 8 are display diagrams showing data binding performed by dragging and dropping database data into a web form and form, respectively. Database data objects generally allow a component to attach directly to existing database tables. The workflow application of the illustrated embodiment provides an easy-to-use drag-and-drop graphical interface that allows the designer to attach a database data object to a control in a web form without the designer having to possess extensive knowledge of SQL database programming.

By binding controls of a web form or form to corresponding fields in a database data object, the database variables are loaded to the controls in the web form or form. At the closing of the web form or form, property controls associated with the data object as it resides in the web form or form are then loaded to the data fields of the data source.

Referring to FIG. 7, drag-and-drop data binding is performed in the workflow application using primarily the design view 202. Upon request of the designer, the workflow application displays a web form 702 and exposes database data objects in the object tree view 704. The designer clicks on the "+" expand node of the database folder in the object tree view 706 to reveal the database's data elements. The designer drags and drops a selected database data element onto a control or other feature associated with the form 708. For example, the control may be a label, button, textbox, checkbox, radio button, combo box, list box, etc. As shown in block 710, the designer has dropped a database data element onto a name combo box 712 on the web form. Such action by the designer results in the workflow application automatically generating the appropriate script or code used to implement the data-bound web form for future use by an end user. In this way, information entered into the web form by an end user can be populated back to the database when the web form is closed.

Once the designer drops the database data element or node on the control or other feature, a database icon 714 may appear that indicates the control is bound to the database element. In some embodiments, a tool tip associated with the icon identifies the exact element that is bound to the control.

In some embodiments, a property of the control or other feature may be available from the property view 214 to help the designer check the success of the database data binding. For example, the property may provide information such as the name of the data object and the path and name of the element or node. From the property view 214, the designer may update, change, or modify the database data binding as needed. The designer may also delete the database data binding. Web form controls can be unbound by clicking or deleting the reference to the database data object and element from the database data binding property.

In some embodiments, form and web form controls can be unbound by deleting the reference to the database data object and field from the database data binding property displayed in the property view 214. Controls with database data binding can be updated by dragging and dropping another database data object onto the control or by editing the database data binding property.

FIG. 8 is a display diagram showing data binding performed by dragging and dropping database data into a form. The same techniques described above with respect to FIG. 7 (for binding database data to a web form) are used for a form. Upon request of the designer, the workflow application displays a form 802 and exposes database data objects in the object tree view 804. The designer clicks on the "+" expand node of the database folder in the object tree view 806 to reveal the database's data elements. The designer drags and drops a selected database data element onto a control or other feature associated with the form 808. For example, the control may be a label, button, textbox, checkbox, data, radio button, combo box, list box, etc. As shown in block 810, the designer has dropped a database data element onto a name combo box 812 on the form. Such action by the designer results in the workflow application automatically generating the appropriate script or code used to implement the data-bound form for future use by an end user. A database icon 814 near the combo box 812 shows that the data binding request has been completed.

IV. System Flows

Figure 9:
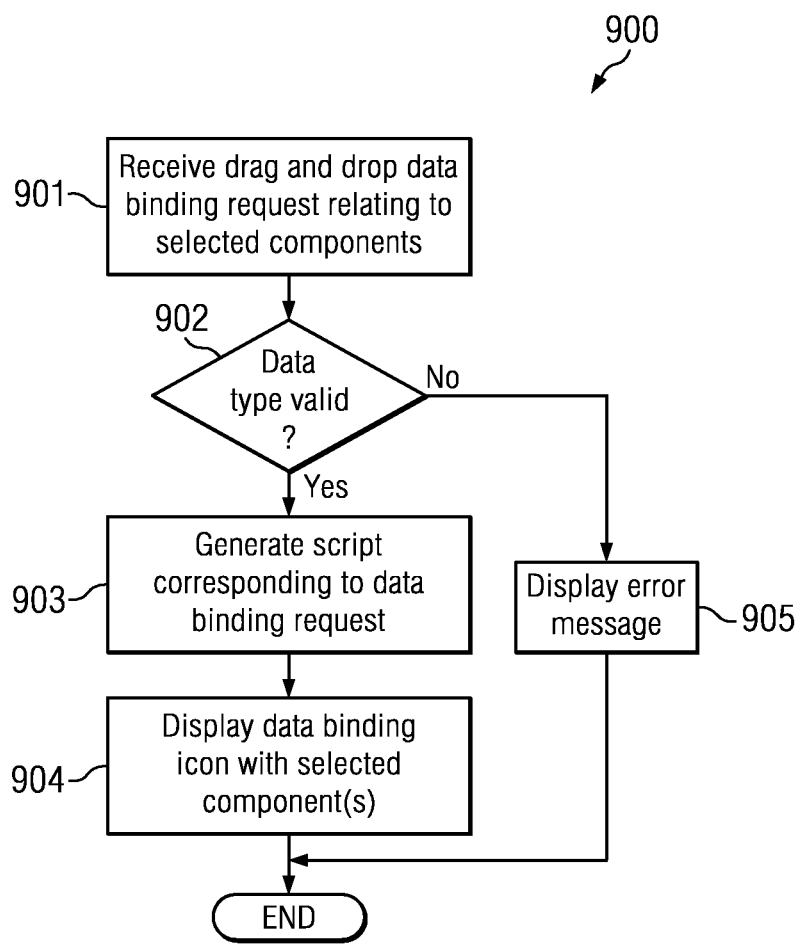
FIG. 9 is a flow diagram showing a routine for automatically generating script or code for data binding.

FIG. 9 is a representative flow diagram that shows a routine 900 for creating a script that implements data binding. This flow diagram does not show all functions or exchanges of data but, instead, provides an understanding of commands and data exchanged under the system. Those skilled in the relevant art will recognize that some functions or exchanges of commands and data may be repeated, varied, omitted, or supplemented, and other aspects not shown may be readily implemented.

At block 901 the routine 900 receives a request for data binding (e.g., a drag and drop of selected data resources onto a selected feature or component). At decision block 902 the routine 900 validates the received request. For example, the routine 900 may check that the data type being dropped onto a control conforms to that control's data structures. If at decision block 902, the data type being dropped onto to the control does not match the control's data structures, the routine 900 continues at block 905, where an error message is displayed before the routine ends. If, however, at decision block 902, the data type being dropped onto the control matches the control's data structure (i.e., the validation is successful), the routine 900 continues at block 903, where the routine automatically generates a script to implement the data binding request. At block 904, the routine 900 displays an icon on or near the feature or component, indicating the data binding has been successfully completed. The routine 900 then ends.

V. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

This application is related to commonly owned U.S. patent application Ser. No. 10/938,396, also filed on Sep. 10, 2004, U.S. Patent Application Publication No. 2005/0066304, which is incorporated by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for drag-and-drop data binding, comprising:
a first computer comprising at least one processor and at least one non-transitory computer readable medium storing instructions translatable by the at least one processor to:
provide in a graphical user interface:
a first view displaying a representation of an electronic form including a representation of a control feature of the electronic form, the control feature having a particular data structure;
a second view displaying a representation of a data object configured to capture or store data, the data object being of a type conforming to the particular data structure; and
a third view displaying a representation of property information relating to the control feature;
in response to a first user using the graphical user interface at the first computer dragging and dropping the representation of the data object from the second view onto the representation of the control feature of the electronic form in the first view of the graphical user interface, automatically generate a script executable by the host application to implement the electronic form with the control feature bound to the data object for future use by a second user,
the automatically generated script specific to implementing the data binding between the data object and the control feature of the electronic form such that the host application captures or stores information, entered by the second user in the electronic form through the control feature, in the data object according to the data binding between the control feature and the data object;
update a set of properties of the control feature based on the data binding between the control feature and the data object to create an updated set of properties;
detect the selection of the control feature in the graphical user interface; and
in response to detecting the selection of the control feature in the graphical user interface, display the updated set of properties of the control feature in the third view,
wherein the updated set of properties of the control feature include a name of the data object and a path associated with the data object.

2. The system of claim 1, wherein:
the instructions further comprise instructions translatable by the at least one processor to provide an integrated development environment for the host application that allows for modification of software components of the host application; and
the graphical user interface is provided as a portion of the integrated development environment.

3. The system of claim 2, further comprising a second computer coupled to the first computer by a network and wherein the host application is configured to:
provide the electronic form over the network for display at the second computer;
receive over the network at the first computer, data entered by an end-user at the second computer using the control feature; and
store the data entered by the end-user using the control feature in the data object according to the binding between the control feature and the data object.

4. The system of claim 1, wherein the representation of the data object is interactively expandable to expose nodes of the data object selectable for drag-and-drop.

5. The system of claim 4, wherein in the representation of the data object, representations of exposed nodes are organized according to a data structure of the data object.

6. The system of claim 1, wherein the instructions further comprise instructions translatable by the at least one processor to:
detect user initiated binding between the control feature and the data object upon the user dragging the representation of the data object from the second view and dropping the representation of the data object onto the representation of the control feature in the first view.

7. A computer program product comprising a non-transitory computer readable medium storing instructions translatable by at least one processor to:
provide in a graphical user interface:
a first view displaying a representation of an electronic form including a representation of a control feature of the electronic form, the control feature having a particular data structure;
a second view displaying a representation of a data object configured to capture or store data, the data object being of a type conforming to the particular data structure; and a third view displaying a representation of property information relating to the control feature;

in response to a first user using the graphical user interface at the first computer dragging and dropping the representation of the data object from the second view onto the representation of the control feature of the electronic form in the first view of the graphical user interface, automatically generate a script executable by the host application to implement the electronic form with the control feature bound to the data object for future use by a second user, the automatically generated script specific to implementing the data binding between the data object and the control feature of the electronic form such that the host application captures or stores information, entered by the second user in the electronic form through the control feature, in the data object according to the data binding between the control feature and the data object;

update a set of properties of the control feature based on the data binding between the control feature and the data object to create an updated set of properties;

detect the selection of the control feature in the graphical user interface; and in response to detecting the selection of the control feature in the graphical user interface, display the updated set of properties of the control feature in the third view, wherein the updated set of properties of the control feature include a name of the data object and a path associated with the data object.

8. The computer program product of claim 7, wherein:

the instructions further comprise instructions translatable by the at least one processor to provide an integrated development environment for the host application that allows for modification of software components of the host application; and the graphical user interface is provided as a portion of the integrated development environment.

9. The computer program product of claim 7, wherein the instructions further comprise instructions translatable by the at least one processor to:

provide the electronic form over a network for display;

receive, over the network, data entered by an end-user using the control feature; and store the data entered by the end-user using the control feature in the data object according to the binding between the control feature and the data object.

10. The computer program product of claim 7, wherein the instructions further comprise instructions translatable by the at least one processor to detect an interaction with the graphical user interface and expand the representation of the data object to expose nodes of the data object selectable for drag-and-drop in response to detecting the interaction.

11. The computer program product of claim 7, wherein in the representation of the data object, representations of exposed nodes are organized according to a data structure of the data object.

12. The computer program product of claim 7, wherein the instructions further comprise instructions translatable by the at least one processor to:

detect user initiated binding between the control feature and the data object upon the user dragging the representation of the data object from the second view and dropping the representation of the data object onto the representation of the control feature in the first view.

13. A method for drag-and-drop data binding comprising:

providing, by a first computer, a graphical user interface for configuring components of a host application, the graphical user interface comprising:

a first view displaying a representation of an electronic form including a representation of a control feature of the electronic form;

a second view displaying a representation of a data object configured to capture or store data; and a third view displaying a representation of property information relating to the control feature;

in response to a first user using the graphical user interface at the first computer dragging and dropping the representation of the data object from the second view onto the representation of the control feature of the electronic form in the first view of the graphical user interface, the host application automatically generating a script executable by the host application to implement the electronic form with the control feature bound to the data object for future use by a second user, the automatically generated script specific to implementing the data binding between the data object and the control feature of the electronic form such that the host application captures or stores information, entered by the second user in the electronic form through the control feature, in the data object according to the data binding between the control feature and the data object;

updating a set of properties of the control feature based on the data binding between the control feature and the data object to create an updated set of properties;

detecting the selection of the control feature in the graphical user interface; and in response to detecting the selection of the control feature in the graphical user interface, displaying the updated set of properties of the control feature in the third view, wherein the updated set of properties of the control feature include a name of the data object and a path associated with the data object.

14. The method of claim 13, further comprising:

providing an integrated development environment for the host application that allows for modification of software components of the host application; and providing the graphical user interface as a portion of the integrated development environment.

15. The method of claim 14, further comprising:

providing the electronic form to a second computer over a network;

receiving at the first computer over the network, data entered by an end-user at the second computer using the control feature; and storing the data entered by the end-user using the control feature in the data object according to the binding between the control feature and the data object.

16. The method of claim 15, further comprising detecting an interaction with the graphical user interface and expanding the representation of the data object to expose nodes of the data object selectable for drag-and-drop in response to detecting the interaction.

17. The method of claim 16, wherein in the representation of the data object, representations of exposed nodes are organized according to a data structure of the data object.

18. The method of claim 13, further comprising:
  detect user initiated binding between the control feature and the data object upon the user dragging the representation of the data object from the second view and dropping the representation of the data object onto the representation of the control feature in the first view.

\* \* \* \* \*